(12) United States Patent
Hallit

(10) Patent No.: US 8,740,611 B2
(45) Date of Patent: Jun. 3, 2014

(54) HIGH CAPACITY FUEL-FIRED LIQUID HEATING APPARATUS

(75) Inventor: Raymond I. Hallit, Newbury Park, CA (US)

(73) Assignee: Rheem Manufacturing Company, Atlanta, GA (US)

( * ) Notice: Subject to any disclaimer, the term of this patent is extended or adjusted under 35 U.S.C. 154(b) by 64 days.

(21) Appl. No.: 13/295,626

(22) Filed: Nov. 14, 2011

(65) Prior Publication Data

US 2012/0208139 A1    Aug. 16, 2012

Related U.S. Application Data

(60) Provisional application No. 61/443,298, filed on Feb. 16, 2011.

(51) Int. Cl.
| | | |
|---|---|---|
| *F23N 5/24* | (2006.01) | |
| *F23D 14/78* | (2006.01) | |
| *F24H 1/40* | (2006.01) | |
| *F23C 5/00* | (2006.01) | |

(52) U.S. Cl.
CPC ............... *F23D 14/78* (2013.01); *F24H 1/403* (2013.01); *F23C 5/00* (2013.01); *F23N 5/24* (2013.01)
USPC ......... 431/23; 122/14.21; 122/15.1; 122/18.1

(58) Field of Classification Search
CPC ......... F23N 1/00; F23N 2039/06; F23N 5/08; F23N 5/20; F23N 5/24; F23D 11/16; F23D 14/78; E21B 41/0071; F23Q 9/12; F24H 1/403; F24H 9/0026; F23C 5/00
USPC ......... 431/23, 7; 122/31.1, 32, 33, 15.1, 18.1, 122/14.21, 13.01; 126/53
See application file for complete search history.

(56) References Cited

U.S. PATENT DOCUMENTS 3,175,540 A    3/1965    Dubin et al.
4,501,232 A *  2/1985    Gordbegli et al. ....... 122/235.14
(Continued)

FOREIGN PATENT DOCUMENTS

JP    05-106918    *    4/1993
JP    05106918 A       4/1993

OTHER PUBLICATIONS

Lochinvar, High Efficiency Commercial Boilers, Dec. 2010, Lochinvar, LLC, Crest Condensing Boiler, 6-Pages.*

(Continued)

*Primary Examiner* — Kenneth Rinehart
*Assistant Examiner* — Bao D Nguyen
(74) *Attorney, Agent, or Firm* — Haynes and Boone, LLP

(57) ABSTRACT

A fuel-fired high capacity liquid heating appliance, representatively a boiler or a water heater, has a fluid heat exchanger extending around a combustion chamber into which first and second fuel burners extend, the first and second burners respectively having associated blowers for supplying combustion air thereto. Illustratively, the combustion chamber is oval-shaped, with the burners extending into opposite ends the combustion chamber If one of the burners is not firing while the other burner is firing, a control system starts the non-firing burner's blower, to protect it from overheating by the firing burner, if the control system senses an excess temperature in the non-firing burner. The heat exchanger comprises a series of fluid receiving tubes extending between baffle-free header structures iteratively sized to equalize fluid flow rates through the heat exchanger tubes over a wide flow rate range.

19 Claims, 3 Drawing Sheets

(56) References Cited

U.S. PATENT DOCUMENTS

| | | |
|---|---|---|
| 4,505,254 A | 3/1985 | Wigdahl |
| 4,852,523 A | 8/1989 | Zeimes |
| 7,647,897 B2 * | 1/2010 | Ootomo et al. ................. 122/33 |
| 7,909,005 B2 * | 3/2011 | Le Mer et al. ............... 122/31.1 |
| 2008/0190134 A1 | 8/2008 | Khatib et al. |

OTHER PUBLICATIONS

Lochinvar Product Catalog for Crest Condensing Boiler, Lochinvar, LLC, 6 pages, Lebanon, Tennessee, USA, www.Lochinvar.com.

Patent Examiner, M10, Paul Bourgeois, Canadian Patent Office, "First Office Action," dated Jun. 14, 2013 for Canadian Patent Application No. 2762493, 3 pages.

* cited by examiner

HIGH CAPACITY FUEL-FIRED LIQUID HEATING APPARATUS

CROSS-REFERENCE TO RELATED APPLICATION

This application claims the benefit of the filing date of U.S. Provisional Application Ser. No. 61/443,298 filed on Feb. 16, 2011 and entitled "High Capacity Fuel-Fired Liquid Heating Apparatus", such provisional application being hereby incorporated herein by reference in its entirety.

BACKGROUND OF THE INVENTION

The present invention generally relates to liquid heating apparatus and, in a representatively illustrated embodiment thereof, more particularly provides a specially designed high capacity gas-fired commercial heating appliance illustratively in the form of a water heater or boiler As conventionally manufactured, multiple burner high capacity fuel-fired liquid heating appliances, such as water heaters or boilers, may have associated therewith various design challenges such as protecting non-firing burners from overheating by adjacent firing burners, and equalizing fluid flow through heat exchanger tubing sections over wide flow rate ranges. Accordingly, it would be desirable to provide a high capacity fuel-fired liquid heating appliance which effectively addresses these design challenges. It is to these design challenges that the present invention is primarily directed.

DETAILED DESCRIPTION

Figure 1:
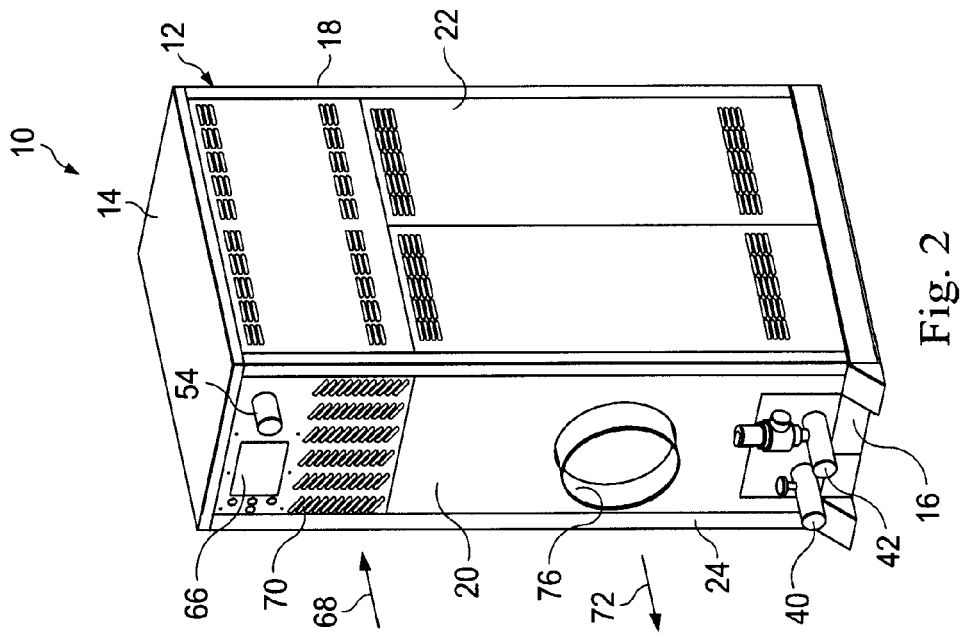
FIG. 1 is a partially cut away front and right side perspective view of the liquid heating apparatus.
Figure 2:
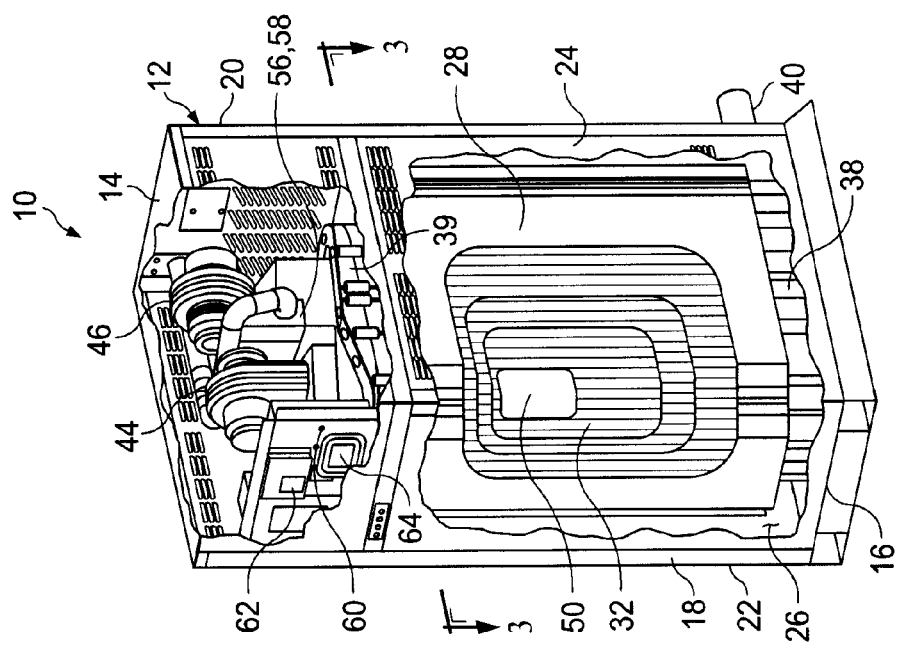
FIG. 2 is a rear and left side perspective view of the liquid heating apparatus.
Figure 3:
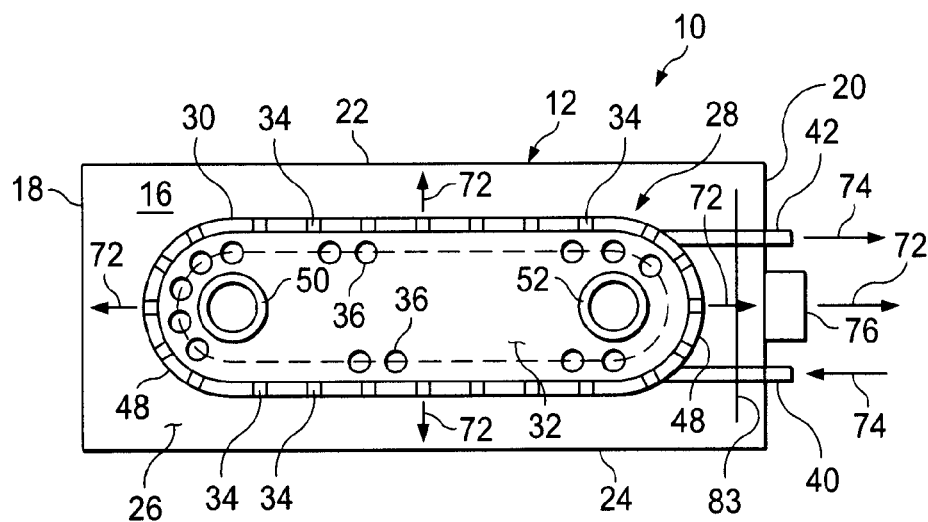
FIG. 3 is a simplified, somewhat schematic cross-sectional through the liquid heating apparatus taken generally along line 3-3 of FIG. 1.

The fuel-fired liquid heating apparatus 10 depicted in FIGS. 1-3 is representatively a high capacity gas-fired commercial water heater or boiler illustratively having, depending on the model provided, a maximum firing rate in the range of from about 2,000,000 Btuh to about 5,000,000 Btuh, but alternatively could utilize a different type of fuel, have a different firing rate capacity, or could be utilized to heat a liquid other than water without departing from principles of the present invention. In the illustrated representative embodiment thereof, the apparatus 10 has a vertically elongated outer metal jacket 12 having a generally rectangular configuration, top and bottom ends 14 and 16, front and rear sides 18 and 20, left and right sides 22 and 24, and an interior space 26.

Operatively disposed within the interior 26 of the jacket 12 is a specially designed heat exchanger assembly 28 that embodies principles of the present invention. The heat exchanger assembly 28, as best illustrated in FIG. 3, has a hollow outer body or baffle 30 with a vertically elongated configuration and, along its vertical length, an elongated, generally oval cross-sectional shape. The interior of the body 30 defines for the apparatus 10 a combustion chamber 32 and, for purposes later described herein, a series of side wall openings 34 are formed through the vertical side wall of the body 30. Extending vertically along an interior side periphery of the combustion chamber 32 are a series of fin/tube type heat exchanger tubes 36 which are coupled, by subsequently described bottom and top header groups 38 and 39, to water inlet and outlet connections 40 and 42 extending outwardly through the rear side 20 of the outer jacket 12.

A pair of combustion air blowers 44 and 46 are positioned as shown within the jacket 12 above the rounded side portions 48 of the heat exchanger outer body 30, with the outlets of the blowers 44,46 being respectively coupled to the inlets of a pair of tubular fuel burners 50,52 that extend downwardly into the combustion chamber 32 as later described herein. Gaseous fuel is supplied to the burners 50,52 via a fuel supply line 54 extending inwardly through the rear side 20 of the jacket 12. Fuel control valves 56,58 disposed in the line 54 are respectively associated with the burners 50, 52. As can be seen in FIG. 3, the burners 50, 52 are positioned in the combustion chamber 32, within the generally oval array of heat exchanger tubes 36, at the opposite ends of a central portion of the combustion chamber 32 that extends between the burners 50, 52 and is substantially devoid of structure intervening between the burners 50, 52.

Other controls operatively associated with the high capacity liquid heating apparatus 10 include a temperature controller 60, a dual safety device/ignition system 62, and an LCD display 64 on the front side 18 of the jacket 12, and an electrical/power supply 66 positioned on the rear side 20 of the jacket 12.

During firing of the liquid heating apparatus 10, combustion air 68 is drawn into the interior of the jacket by one or both of the blowers 44,46 via a filtered air intake 70 on the rear side 20 of the jacket. Combustion air 68 drawn into one or both of the blowers 44,46 is forced into one or both of the burners 50,52 wherein the air mixes with fuel supplied to the burners and is combusted with the fuel to form hot combustion products 72 that are downwardly discharged into the combustion chamber 32. Combustion products 72 entering the combustion chamber 32 are forced across the finned heat exchanger tubes 36 to transfer combustion heat to water 74 being flowed therethrough via the inlet and outlet connections 40 and 42. Reduced temperature combustion products 72 are then discharged to the interior jacket space 26, via the side wall openings 34 in the heat exchanger body 30 and flow outwardly from the jacket interior 26 via a combustion product outlet connection 76 on the rear side 20 of the jacket 12.

A suitably supported vertical baffle panel 83 (see FIG. 3) is disposed within the jacket 12, forwardly of the combustion product outlet connection 76, and functions in a generally conventional manner to prevent short circuiting of the hot combustion products 72 from the heat exchanger assembly 28 to the combustion product outlet connection 76.

Figure 4:
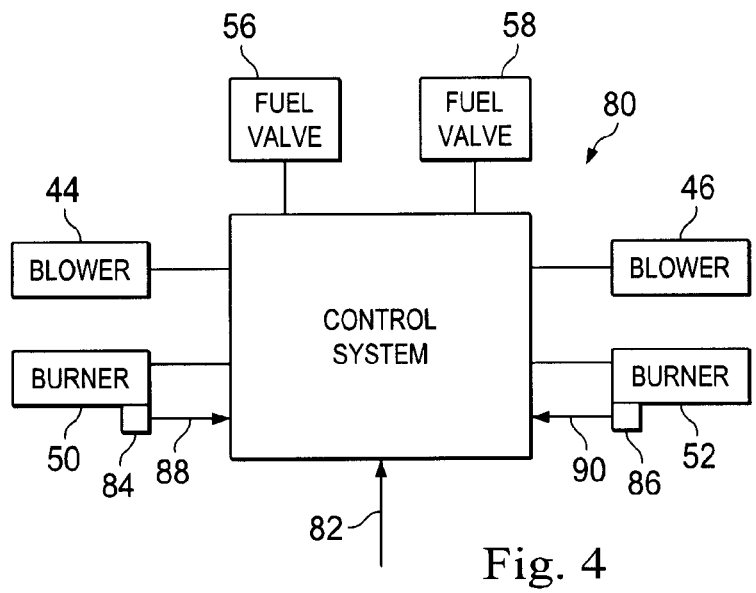
FIG. 4 is a simplified schematic diagram of a control system utilized with the liquid heating apparatus.

Turning now to FIG. 4, a schematically depicted control system 80 is operative to receive a water temperature signal 82 transmitted, for example, from a temperature sensor (not shown) that detects the temperature of water exiting the water outlet line 42, and responsively energize and modulate either or both of the blower/burner sets 44,50 and 46,52, including modulating their associated fuel valves 56 and 58, as necessitated by operating conditions and the particular water temperature set point.

In addition to providing the control flexibility of utilizing dual burners operatively positioned in a horizontally spaced apart relationship within a single combustion chamber, the present invention provides the additional advantageous aspect of protecting the burners 50,52 from thermal damage in the event that either of them is in a non-firing state while the other burner is being fired under the control of the system 80.

This unique feature is achieved in the present invention by operatively associating with each of the burners 50,52 a temperature sensing device such as the illustrated thermistors 84 and 86, to provide to the control system 80 burner temperature signals 88,90 respectively indicative of the temperatures of the air inside the burners 50 and 52. If one of the burners 50,52 is in a non-firing state during the firing of the other burner and the non-firing burner's thermistor temperature signal is above a predetermined magnitude, the control system 80 is automatically operative to start the blower associated with the non-firing burner and initiate a flow of cooling air through the non-firing burner to protect it (and its associated controls) from overheating due to the heat being generated within the combustion chamber 32 by the firing burner.

Further overheating protection for the non-firing burner is afforded by the elongated, preferably generally oval cross-sectional shape of the vertical heat exchanger body 30 within which the two burners 50,52 extend downwardly through the top sides of the rounded horizontally opposite end portions of the body 30 inwardly of the interior array of heat exchange tubes 36. This places the burners 50,52 at substantially a maximum horizontal operational distance away from one another within the combustion chamber 32, thereby lessening the firing heat transferred to the non-firing burner from the firing burner.

Figure 6:
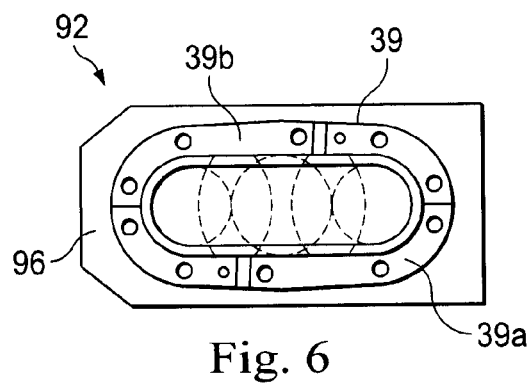
FIG. 6 is a top plan view of the removed heat exchanger tube and header structure.
Figure 5:
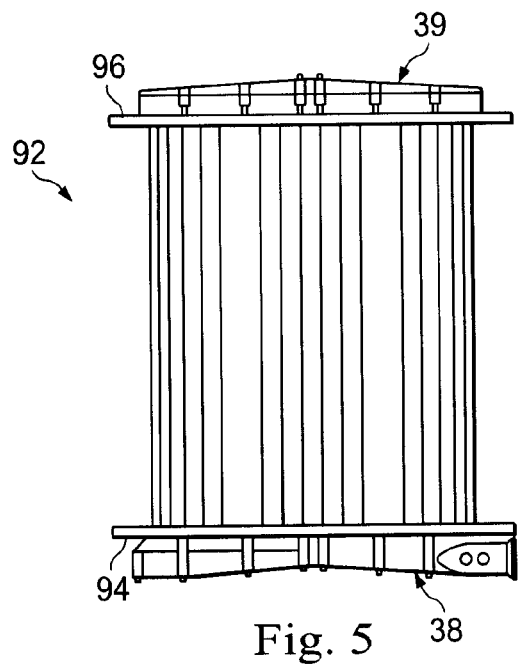
FIG. 5 is a right side elevational view of a specially designed heat exchanger tube and header structure removed from the overall liquid heating apparatus.
Figure 7:
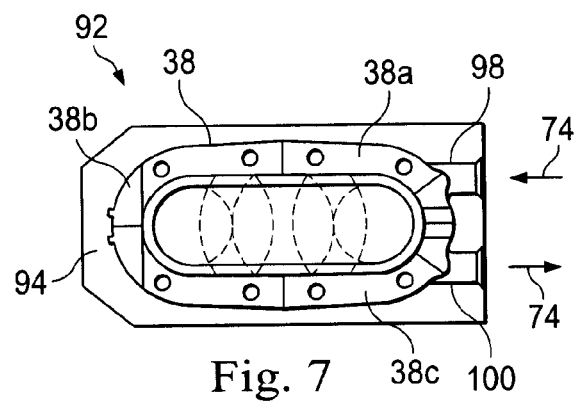
FIG. 7 is a bottom plan view of the removed heat exchanger tube and header structure.

FIGS. 5-7 illustrate a heat exchange tube and header portion 92 of the heat exchanger assembly 28 removed from the overall liquid heating apparatus 10. The tube and header portion 92 includes the previously mentioned vertically extending finned heat exchange tubes 36 and the bottom and top water heater groups 38,39 between which they extend. The bottom header group 38 is operatively mounted on the bottom side of a bottom closure plate 94 which forms the bottom end of the combustion chamber 32. The top header group 39 is mounted on the top side of a top closure plate 96 which forms the top end of the combustion chamber 32 and through which the aforementioned burners 50,52 downwardly extend into the combustion chamber 32.

As best illustrated in FIGS. 6 and 7, the bottom water flow header group 38 representatively comprises a generally oval array of three separate arcuate headers 38a,38b and 38c, and the top water flow header group 39 representatively comprises a generally oval array of two separate arcuate headers 39a and 39b. By way of non-limiting example, there are forty eight vertical finned heat exchange tubes 36 in the heat exchanger assembly 28. A first group of twelve tubes 36 interconnects the headers 38a and 39a; a second group of twelve tubes 36 interconnects the headers 39a and 38b; a third group of twelve tubes 36 interconnects the headers 38b and 39b; and a fourth group of twelve tubes 36 interconnects the headers 39b and 38c. As illustrated, an inlet connection 98 (connectable to the exterior inlet connection 40) is coupled to the bottom header 38a, and an outlet connection 100 (connectable to the exterior outlet connection 42) is coupled to the bottom header 38c.

During operation of the liquid heating apparatus 10, water 74 flows sequentially (1) into the bottom header 38a through the inlet connection 98; (2) upwardly from the bottom header 38a into the top header 39a through the first group of tubes 36; (3) downwardly from the top header 39a into the bottom header 38b through the second group of tubes 36; (4) upwardly from the bottom header 38b into the top header 39b through the third group of tubes 36; (5) downwardly from the top header 39b into the bottom header 38c through the fourth group of tubes 36; and then (6) outwardly through the outlet connection 100.

According to a further aspect of the present invention, the interiors of the headers in the bottom and top header groups 38 and 39 are devoid of baffles which are customarily utilized in liquid heat exchanger headers in an attempt to equalize flow through their associated heat exchanger tubes. Instead of utilizing these baffles, which tend to undesirably increase the liquid pressure drop through their associated heat exchanger structures, in the present invention the interiors of the headers in the bottom and top header groups 38 and 39 are iteratively configured to provide a substantially equal water flow through each of the finned heat exchange tubes 36 (within about a ±10% range) over a wide variation in total water flow rate through the heat exchanger assembly 28. By way of non-limiting example, such flow rate range is between about 60 gpm to about 270 gpm. After the iterative design of the interior configurations of the baffle-free headers is completed, the accuracy of the designed-for balancing of the water flow through the tubes 36 over the desired water flow rate range may be verified using a conventional computational flow dynamics (CFD) analysis program well known to those skilled in this particular art.

The foregoing detailed description is to be clearly understood as being given by way of illustration and example only, the spirit and scope of the present invention being limited solely by the appended claims.

What is claimed is:

1. Fuel-fired liquid heating apparatus comprising:
   a heat exchanger through which a liquid to be heated may be flowed;
   first and second fuel burners operable to receive fuel and combustion air from sources thereof and create hot combustion products used to transfer combustion heat, via said heat exchanger, to liquid flowing through said heat exchanger;
   first and second combustion air blowers respectively associated with said first and second fuel burners and operable to supply combustion air thereto for mixture with fuel supplied to said first and second fuel burners from a source other than said first and second combustion air blowers; and
   a control system automatically operable in response to (1) non-firing of one of said first and second fuel burners and (2) firing of the other of said first and second fuel burners, to protect the non-firing burner against being overheated by heat from the firing burner by sensing a temperature of the non-firing burner and responsively starting its associated combustion air blower to cool the non-firing burner when the sensed temperature reaches a predetermined magnitude.

2. The fuel-fired liquid heating apparatus of claim 1 wherein:
   said fuel-fired liquid heating apparatus is a boiler.

3. The fuel-fired liquid heating apparatus of claim 1 wherein:
   said fuel-fired liquid heating apparatus is a water heater.

4. The fuel-fired liquid heating apparatus of claim 1 wherein:

said control system is operative to sense said temperature within an interior portion of the non-firing burner.

5. The fuel-fired liquid heating apparatus of claim 1 wherein:
said heat exchanger extends around and partially bounds a combustion chamber, and
at least portions of said first and second fuel burners extend into said combustion chamber.

6. The fuel-fired liquid heating apparatus of claim 5 wherein:
said combustion chamber has an elongated cross-section with first and second opposite end portions, and
said first and second fuel burners respectively extend into said first and second opposite end portions of said combustion chamber.

7. The fuel-fired liquid heating apparatus of claim 1 wherein:
said heat exchanger comprises spaced apart first and second pluralities of liquid header segments interconnected by a series of straight, parallel tubes, the interiors of said liquid header segments being devoid of fluid flow baffles.

8. The fuel-fired liquid heating apparatus of claim 7 wherein:
the interiors of said liquid header segments are iteratively configured to provide a substantially equal fluid flow through each of said tubes over a substantial range of liquid flow rates through the interior of said heat exchanger.

9. The fuel-fired liquid heating apparatus of claim 8 wherein:
said range of liquid flow rates is between about 60 gpm to about 270 gpm.

10. The fuel-fired liquid heating apparatus of claim 9 wherein:
said liquid is water.

11. The fuel-fired liquid heating apparatus of claim 1 wherein:
said fuel-fired liquid heating apparatus is a gas-fired liquid heating apparatus.

12. The fuel-fired liquid heating apparatus of claim 1 wherein:
the firing rate of said fuel-fired liquid heating apparatus is in the range of from about 2,000,000 Btuh to about 5,000,000 Btuh.

13. Fuel-fired water heating apparatus comprising:
a heat exchanger through which water to be heated may be flowed, said heat exchanger having a series of straight, parallel tubes with opposite first and second ends, said tubes extending around and at least partially bounding a combustion chamber having an elongated, generally oval-shaped cross-section having first and second opposite end portions, said heat exchanger having spaced apart first and second pluralities of water header segments respectively coupled to said first and second ends of said tubes, the interiors of said water header segments being devoid of water flow baffles and being iteratively configured to provide a substantially equal water flow through each of the tubes over a substantial range of water flow rates through the interior of said heat exchanger;
first and second spaced apart fuel burners operable to receive fuel and combustion air from separate sources thereof and create hot combustion products used to transfer combustion heat, via said heat exchanger, to water flowing through said heat exchanger, at least portions of said first and second fuel burners respectively extending into said first and second opposite end portions of said combustion chamber, the combustion chamber interior space between said first and second spaced apart fuel burners being substantially devoid of structure intervening between said first and second fuel burners;
first and second combustion air blowers respectively associated with said first and second fuel burners and operable to supply combustion air thereto for mixture with fuel separately supplied to said first and second fuel burners; and
a control system automatically operable in response to (1) non-firing of one of said first and second fuel burners and (2) firing of the other of said first and second fuel burners, to protect the non-firing burner against being overheated by heat from the firing burner by sensing a temperature of the non-firing burner and responsively starting its associated combustion air blower to cool the non-firing burner when the sensed temperature reaches a predetermined magnitude.

14. The fuel-fired water heating apparatus of claim 13 wherein:
said fuel-fired water heating apparatus is a boiler.

15. The fuel-fired water heating apparatus of claim 13 wherein:
said fuel-fired water heating apparatus is a water heater.

16. The fuel-fired water heating apparatus of claim 13 wherein:
said control system is operative to sense said temperature within an interior portion of the non-firing burner.

17. The fuel-fired water heating apparatus of claim 13 wherein:
said range of fluid flow rates is between about 60 gpm to about 270 gpm.

18. The fuel-fired water heating apparatus of claim 13 wherein:
the firing rate of said fuel-fired water heating apparatus is in the range of from about 2,000,000 Btuh to about 5,000,000 Btuh.

19. Fuel-fired water heating apparatus comprising:
a heat exchanger through which water to be heated may be flowed, said heat exchanger having a series of straight, parallel tubes with opposite first and second ends, said tubes extending around and at least partially bounding a combustion chamber having an elongated, generally oval-shaped cross-section having first and second opposite end portions;
first and second spaced apart fuel burners operable to receive fuel and combustion air from separate sources thereof and create hot combustion products used to transfer combustion heat, via said heat exchanger, to water flowing through said heat exchanger, at least portions of said first and second fuel burners respectively extending into said first and second opposite end portions of said combustion chamber, the combustion chamber interior space between said first and second spaced apart fuel burners being substantially devoid of structure intervening between said first and second fuel burners;
first and second combustion air blowers respectively associated with said first and second fuel burners and operable to supply combustion air thereto for mixture with fuel separately supplied to said first and second fuel burners; and
a control system automatically operable in response to (1) non-firing of one of said first and second fuel burners and (2) firing of the other of said first and second fuel burners, to protect the non-firing burner against being overheated by heat from the firing burner by sensing a temperature of the non-firing burner and responsively starting its associated combustion air blower to cool the non-firing burner when the sensed temperature reaches a predetermined magnitude.

\* \* \* \* \*